United States Patent
Gumbel et al.

(10) Patent No.: US 7,236,090 B2
(45) Date of Patent: Jun. 26, 2007

(54) AUTOMATED SEQUENCING OF OPERATIONS IN A MOTOR VEHICLE UPON STOPPING AT A RAILROAD CROSSING

(75) Inventors: Matthew J. Gumbel, Fort Wayne, IN (US); Joseph A. Bell, Markle, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 170 days.

(21) Appl. No.: 11/080,185

(22) Filed: Mar. 15, 2005

(65) Prior Publication Data

US 2006/0220821 A1 Oct. 5, 2006

(51) Int. Cl.
*B60Q 1/26* (2006.01)
*B60L 1/14* (2006.01)

(52) U.S. Cl. .................. 340/468; 340/433; 340/425.5; 340/466; 340/901; 307/10.8

(58) Field of Classification Search ................ 340/468, 340/469, 433
See application file for complete search history.

(56) References Cited

U.S. PATENT DOCUMENTS 6,396,395 B1    5/2002  Zielinski et al.
6,580,362 B1 *  6/2003  Zimmerman et al. .... 340/425.5

* cited by examiner

*Primary Examiner*—Donnie L. Crosland
(74) *Attorney, Agent, or Firm*—Jeffrey P. Calfa; Gerald W. Askew; Susan L. Lukasik

(57) ABSTRACT

A system and method for the automated sequencing of certain operations when a vehicle, such as a school bus, (10) approaches a railroad crossing where it is required to stop before proceeding across the crossing. A devoted switch (28) is actuated by the driver to initiate the sequence. After stopping, vehicle speed or distance traveled is used to restore conditions of various devices whose operation was affected by the initial switch actuation.

13 Claims, 1 Drawing Sheet

AUTOMATED SEQUENCING OF OPERATIONS IN A MOTOR VEHICLE UPON STOPPING AT A RAILROAD CROSSING

FIELD OF THE INVENTION

This invention relates generally to motor vehicles, especially motor vehicles that carry passengers, such as busses that carry school students. More particularly, the invention relates to the implementation in the vehicle electrical system of a program for the automated sequencing of certain operations when the vehicle approaches a railroad crossing where it is required to stop before proceeding across the crossing.

BACKGROUND OF THE INVENTION

By law and/or regulation, certain motor vehicles, such as school busses, are required to come to a stop ahead of a railroad crossing before proceeding across the crossing. In addition to stopping the vehicle, the driver typically takes certain actions in the interest of safety. Some of those actions may be mandated by law and/or regulations, and others may be voluntary.

A typical sequence of driver actions comprises operating a switch, commonly called a hazard warning switch, to begin flashing certain exterior lamps on the vehicle for alerting other vehicles in the vicinity that the vehicle is intending to slow down and stop at the crossing. When the driver steps on the brake pedal to apply the vehicle brakes, stop lamps at the rear will also illuminate. Sound emanating from certain on-board electrical accessory equipment that may be operating, (fans, blowers, and radios are examples) may be silenced by shutting off such equipment, or the sounds may at least be toned down by suitable attenuation such as reducing audio speaker volume and slowing fan or blower speed.

Once the vehicle has been brought to a complete stop, a front entrance and exit door at a side of the vehicle opposite the driver side is opened to allow the driver a less obstructed view in one direction along the railroad tracks. When the driver has determined that it is permissible to proceed across the tracks, he or she releases the brakes, re-closes the open door, turns off the hazard warning switch, and can restore desired operation of any accessory equipment that had been turned off or toned down.

For performing such a sequence of events, it has been necessary for a driver to operate several individual switches or controls in anticipation of a railroad crossing stop and then operate them again after the stop. Those actions require driver attention and add to the number of times that individual controls or switches are operated.

U.S. Pat. No. 6,396,395 B1 describes a programmable vehicle stopping system and process for route learning. The description includes the automation of certain vehicle functions that are performed in connection with stopping of a school bus to let students on or off.

SUMMARY OF THE INVENTION

The present invention relates to a system and method for the automated sequencing of certain operations when a vehicle approaches a railroad crossing where it is required to stop before proceeding across the crossing. Unlike the system and process described in U.S. Pat. No. 6,396,395 B1, the present invention is directed to a situation where passengers are typically not let on or off the bus.

The invention contemplates the inclusion of a devoted railroad crossing switch in association with an on-board electrical system controller (ESC) and the inclusion of algorithms in the ESC to create virtual controllers for various on-board devices that enable those devices to automatically operates in particular ways when the devoted switch is actuated by the driver upon approaching a railroad crossing. After the vehicle has been brought to a complete stop at a crossing, the invention provides for the use of one or more sources of on-board data other than the devoted switch to restore the controlled devices to the conditions they were in before actuation of the devoted crossing switch.

By providing a single switch actuation to perform a sequence of various functions associated with a motor vehicle's approach to, stopping at, and subsequent crossing of, a railroad crossing, the invention is believed to provide a better solution than the present practice of requiring the driver to actuate multiple individual switches. Although the expense of an additional devoted switch is required to implement the invention, the other switches are subject to less frequent operation, likely providing those switches with extended useful lives measured in terms of accumulated vehicle mileage. Moreover, the need to actuate only a single switch upon approaching a crossing may reduce driver distraction and/or fatigue.

Accordingly, one general aspect of the invention relates to a motor vehicle that is mandated by law or regulation to stop at a railroad crossing before proceeding across the crossing and to the automated sequencing of certain functions upon approaching the crossing. A devoted switch accessible to a seated driver serves to signal an ESC to initiate a sequence of operations via virtual controllers in the ESC that control a power actuator for an entrance and exit door, exterior lamps, and one or more other accessories. The sequence comprises flashing the exterior lamps, muting the sound from the accessories, and upon the ESC's receipt of data indicating that the vehicle has stopped, operating the power actuator to open the door. Upon subsequent receipt of data disclosing that the vehicle has begun to move forward, the power actuator is operated to close the door, the muted accessories are unmuted, and flashing of the lamps ceases.

Another general aspect of the invention relates to the method that is inherent in the operation just been described.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figure 1:
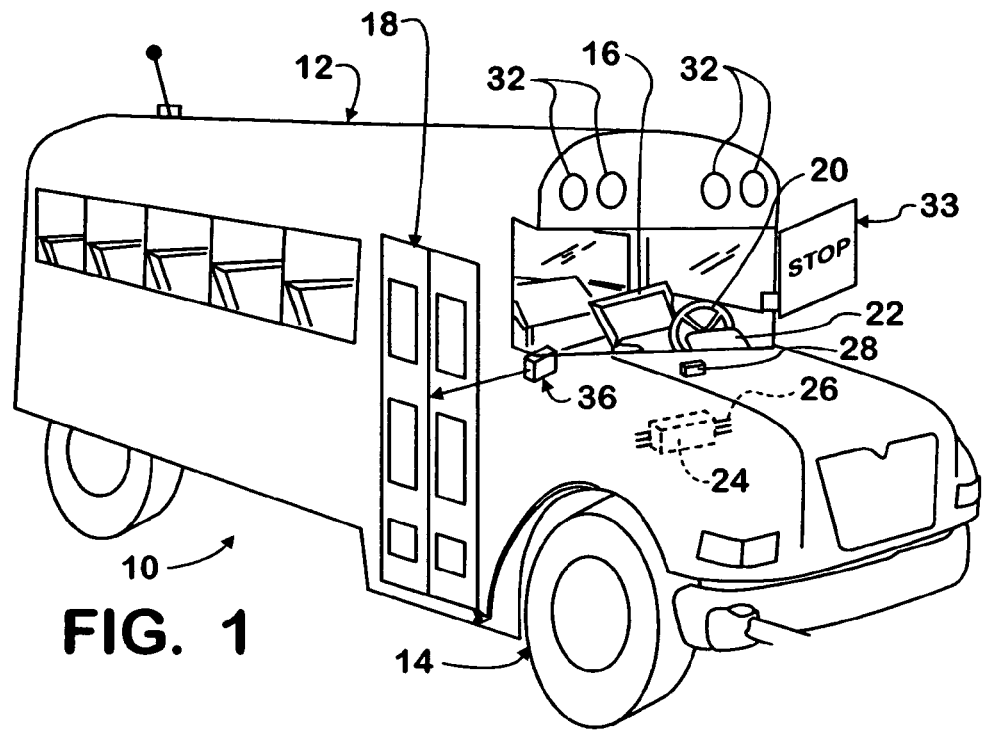
FIG. 1 is a perspective view toward the front right corner of a motor vehicle, a school bus in particular, having a devoted railroad crossing switch and automated function sequencing of the present invention.

FIG. 1 shows a school bus 10 comprising a body 12 mounted on a chassis 14 that comprises an engine, a drivetrain, and wheels for propelling the bus. On its interior, body 12 has a driver's seat 16 at the left front and an entrance/exit door 18 at the right front opposite seat 16. A steering wheel 20 and instrument panel 22 are in front of seat 16. Bus 10 comprises an electrical system that may comprise separate body and chassis system controllers that can communicate with each other, or alternatively a single system controller.

For purposes of the present disclosure, bus 10 is considered to have a body electrical system controller (ESC) 24 that exercises control over certain equipment of body 12 but that receives from a chassis system controller (not shown in FIG. 1) via a data bus 26, certain data that is utilized in practice of the present invention.

Figure 2:
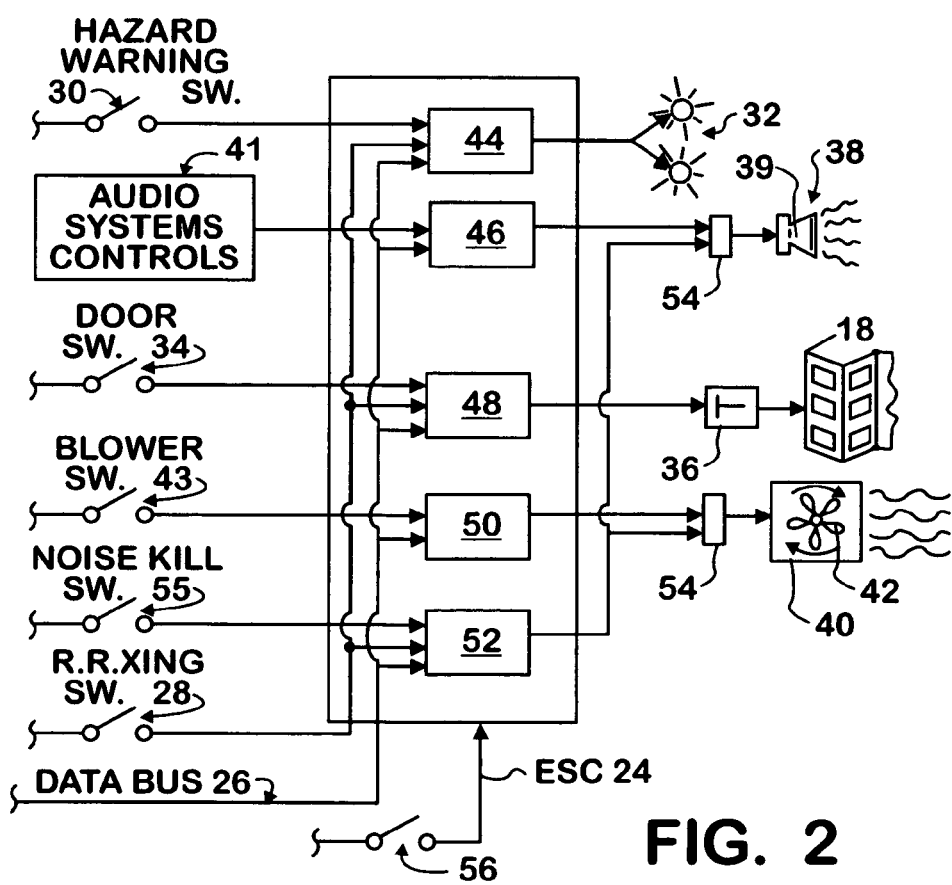
FIG. 2 is a schematic diagram of a portion of the vehicle's electrical system relevant to the present invention.

FIG. 2 shows an implementation of the present invention in bus 10. Principles of the invention are implemented by the inclusion of a devoted switch 28 in instrument panel 22 and algorithms programmed in one or more processors of ESC 24 for repeatedly processing certain data to yield data for control of certain functions performed by certain equipment in bus 10.

A switch 30 that is accessible to the driver of the bus can be switched on and off by the driver to flash lamps 32 at various locations on the exterior of bus 10 when switched on. A sign 33 (FIG. 1) may also be deployed. Switch 30 forms one input to ESC 24. When ESC 24 detects that switch 30 has been switched on to request flashing of warning lamps, ESC 24 issues an appropriate data command to cause the lamps to flash.

Bus 10 also has a door switch 34 that can be operated by the driver to open and close door 18 via an electric actuator 36. Switch 34 forms another input to ESC 24. When switch 30 is operated to request door 18 to open, ESC 24 responds by issuing an appropriate data command to cause the actuator to open the door. When switch 34 is operated to request the door to close, ESC 24 responds by issuing an appropriate data signal to cause the actuator to close the door.

Bus 10 also has an audio system 38, a radio for example, that has one or more speakers 39 that can be heard by the driver. The volume of the speakers can be set by controls 41 that include a volume control that is subject to being muted either partially or entirely.

Bus 10 also has an air circulation system 40 that comprises a blower or fan 42 controlled by a switch 43 for circulating air within portions of the interior of body 12. Such a blower or fan may be an element of a climate control system for heating and cooling the interior, particularly in the vicinity of seat 16.

Bus 10 may be mandated by law or regulation to stop at a railroad crossing before proceeding across the crossing. In accordance with principles of the invention, bus 10 comprises a system and method for the automated sequencing of certain operations when it approaches a railroad crossing before stopping at the crossing. The sequencing continues to a time after the bus has proceeded across the crossing so that functions that were performed prior to the sequencing are restored.

The disclosed embodiment of the invention interacts with the exterior lamps, the entrance/exit door, the audio system, and the air circulation system to automatically sequence certain operations upon actuation of switch 28. Switch 28 may be designated as a railroad crossing switch that is intended to be actuated by the driver upon approaching a railroad crossing in advance of stopping at the crossing.

The inclusion of certain algorithms in ESC 24 creates what are in effect virtual controllers that allow switch 24 to interact with the warning lamps, the entrance and exit door, the audio system, and the air circulation system when switch 24 is actuated by the driver upon approaching a railroad crossing. After bus 10 has been brought to a complete stop, one or more sources of on-board data other than switch 28 restore the warning lamps, the entrance/exit door, the audio system, and the air circulation system to the conditions they were in before actuation of switch 28, in the absence of any contrary commands from elsewhere.

FIG. 2 shows virtual controllers 44, 46, 48, 50 associated respectively with lamps 32, speakers 39, door actuator 36, and fan or blower 42. Speakers 39 are associated with virtual controller 46 through contacts of a noise kill relay 54 that is present in the bus and that can be independently operated by a kill switch 55. Fan or blower 42 is associated with virtual controller 50 through other contacts of relay 54. A further virtual controller 52 operates relay 54. When bus 10 is approaching a railroad crossing, lamps 32 will typically not be flashing and door 18 will typically be closed. The audio system and the fan or blower may or may not be on. The automated sequence is initiated by the driver actuating switch 28.

Virtual controller 44 commands lamps 32 to begin flashing, and virtual controller 52 will operate relay 54 to force the audio system to be muted, shutting off or at least attenuating sound emanating from speakers 39, and likewise force blower or fan 42 to stop or at least slow down to reduce fan or blower noise. Virtual controller 48 will cause actuator 36 to open door 18, either concurrent with actuation of switch 28 or alternately, upon forward speed falling below some defined speed (which may be zero speed) after switch 28 has been actuated.

Data bus 26 furnishes vehicle speed data to ESC 24. After bus 10 has stopped and thereafter begins to proceed across the crossing, attainment of a predetermined speed may be used to turn off lamps 32 and operate actuator 36 to close door 18. The speed of bus 10 at which door 18 closes may be different from that at which lamps 32 stop flashing. Vehicle speed may also be used as a factor to unmute the audio system and to allow or restore fan or blower operation.

An alternative to using speed as a factor to turn off lamps 32, close door 18, unmute the audio system, and to allow or restore fan or blower operation, is using distance traveled after stopping. Distance is of course the time integral of speed, and so distance data may be obtained by mathematical integration preformed by ESC 24, if not directly available from data bus 26.

Finally, if bus 10 encounters a railroad crossing that has a number of tracks that must be crossed, the driver can actuate a further switch 56 that extends the distance that the bus must travel after stopping before lamps 32 turn off, door 18 closes, the audio system unmutes, and to fan or blower operation can be restored.

The automated sequencing of functions that occur upon actuation of switch 28 may include the function of playing a pre-recorded announcement over the audio system before it is completely silenced. Such an announcement could be a message asking the passengers (possibly noisy schoolchildren) to please be quiet so that the driver can listen for a train.

While a presently preferred embodiment of the invention has been illustrated and described, it should be appreciated that principles of the invention are applicable to all embodiments that fall within the scope of the following claims.

What is claimed is:

1. A motor vehicle that is mandated by law or regulation to stop at a railroad crossing before proceeding across the crossing, the vehicle comprising:

a body having an interior with a driver's seat at a front of the body on one side and an entrance and exit door on the other side opposite the driver's seat;

a power actuator for opening and closing the door;

lamps on the exterior of the body that are visible to other vehicles in the vicinity of the vehicle;

one or more accessories that generate sound that can be heard by a driver in the seat;

an electrical system comprising an electrical system controller (ESC) that processes data from various sources to provide control data for performing certain control functions incidental to operation of the vehicle;

a devoted switch accessible to a driver in the seat for signaling the ESC to initiate a sequence of operations when actuated by a driver upon the vehicle approaching a railroad crossing;

virtual controllers in the ESC that control the power actuator for the door, the lamps, and the one or more accessories, and that are responsive to actuation of the devoted switch by a driver a) to begin flashing the lamps, b) to mute the sound from the accessories, c) upon the ESC's receipt of data indicating that the vehicle has stopped, to operate the power actuator to open the door, d) upon subsequent receipt of data indicating that the vehicle has begun to move forward, operating the power actuator to close the door, e) unmuting the muted accessories, and f) ceasing flashing the lamps.

2. A motor vehicle as set forth in claim 1 in which the one or more accessories comprises a speaker of an audio system.

3. A motor vehicle as set forth in claim 1 in which the one or more accessories comprises a motorized blower of an air circulation system.

4. A motor vehicle as set forth in claim 1 in which the data indicating that the vehicle has begun to move comprises vehicle speed data defining a selected speed.

5. A motor vehicle as set forth in claim 1 in which the data disclosing that the vehicle has begun to move comprises vehicle travel data indicating a selected distance that the vehicle has traveled after the stop.

6. A motor vehicle as set forth in claim 1 including an additional input device for the ESC for operation by a driver to extend a selected distance for allowing the vehicle to cross a longer crossing than a cross contemplated by the selected distance.

7. A method for performing a sequence of certain functions in a motor vehicle that is mandated by law or regulation to stop at a railroad crossing before proceeding across the crossing and that comprises a body having an interior driver's seat that is disposed at the front of the body to one side and an entrance and exit door on the other side opposite the driver's seat, a power actuator for opening and closing the door, lamps on the exterior of the body that are visible to other vehicles in the vicinity of the vehicle, one or more accessories that generate sound that can be heard by a driver, and an electrical system comprising an electrical system controller (ESC) that processes data from various sources to provide control data for performing certain control functions incidental to operation of the vehicle;

the method comprising:

providing a devoted switch for actuation by a driver occupying the seat upon the vehicle approaching a railroad crossing to signal the ESC to initiate a sequence of operations;

causing the ESC to respond to actuation of the devoted switch by causing a) the lamps to begin flashing, b) sound from the accessories to be muted, c) upon the ESC's receipt of data indicating that the vehicle has stopped, the power actuator to open the door, d) upon subsequent receipt of data indicating that the vehicle has begun to move forward, the power actuator to close the door, e) the muted accessories to be unmuted, and f) flashing the lamps to cease.

8. A method as set forth in claim 7 in which the one or more accessories comprises a speaker of an audio system.

9. A method as set forth in claim 7 in which the one or more accessories comprises a motorized blower of an air circulation system.

10. A method as set forth in claim 7 in which the data indicating that the vehicle has begun to move comprises vehicle speed data defining a selected speed.

11. A method as set forth in claim 7 in which the data indicating that the vehicle has begun to move comprises vehicle travel data disclosing a selected distance that the vehicle has traveled after the stop.

12. A method as set forth in claim 7 including providing an additional input device for the ESC for operation by a driver and using the additional input device to extend a selected distance for allowing the vehicle to cross a longer crossing than a crossing contemplated by the selected distance.

13. A method as set forth in claim 8 including playing a prerecorded announcement over the speaker upon actuation of the devoted switch to request passengers to be quiet so that the driver can listen for a train.

* * * * *